(12) United States Patent
Kilday

(10) Patent No.: US 8,997,661 B1
(45) Date of Patent: Apr. 7, 2015

(54) TABLE TOP EXTENSION AND METHOD FOR INCREASING THE TABLE TOP SURFACE AREA OF AN EXISTING TABLE TOP

(71) Applicant: GRK Manufacturing Company, Hamilton, OH (US)

(72) Inventor: Gary R. Kilday, Cincinnati, OH (US)

(73) Assignee: GRK Manufacturing Company, Hamilton, OH (US)

( * ) Notice: Subject to any disclaimer, the term of this patent is extended or adjusted under 35 U.S.C. 154(b) by 0 days.

(21) Appl. No.: 14/300,710

(22) Filed: Jun. 10, 2014

(51) Int. Cl.
*A47B 13/08* (2006.01)
*A47B 1/00* (2006.01)

(52) U.S. Cl.
CPC ............... *A47B 13/088* (2013.01); *A47B 1/00* (2013.01)

(58) Field of Classification Search
USPC ......... 108/90, 50.12, 67, 66, 65, 54.1, 26, 64, 108/14, 13, 11
See application file for complete search history.

(56) References Cited

U.S. PATENT DOCUMENTS

| | | | | | |
|---|---|---|---|---|---|
| 955,804 | A | * | 4/1910 | Hyde | 108/90 |
| 1,411,741 | A | * | 4/1922 | Merdzinski | 108/66 |
| 1,655,607 | A | * | 1/1928 | Hueter | 108/66 |
| 2,595,845 | A | * | 5/1952 | Hagwell | 108/66 |
| 2,634,183 | A | * | 4/1953 | Derman et al. | 108/90 |
| 3,029,113 | A | * | 4/1962 | Draxler | 108/90 |
| 3,103,185 | A | * | 9/1963 | McGuirk | 108/64 |
| 3,303,797 | A | * | 2/1967 | Mueller | 108/63 |
| 4,227,467 | A | * | 10/1980 | Kindsfather | 108/101 |
| 5,197,394 | A | * | 3/1993 | Schmidt | 108/50.12 |
| 5,335,803 | A | * | 8/1994 | O'Brien et al. | 108/50.12 |
| 6,164,211 | A | * | 12/2000 | Faris | 108/11 |
| 6,477,966 | B1 | * | 11/2002 | Petryna | 108/11 |
| 6,837,386 | B1 | * | 1/2005 | Kent et al. | 108/50.12 |
| 7,004,082 | B2 | * | 2/2006 | Yang | 108/50.12 |
| 7,107,913 | B2 | * | 9/2006 | Smith | 108/64 |
| 7,250,013 | B2 | * | 7/2007 | Hao | 108/90 |
| 7,748,537 | B1 | * | 7/2010 | Manger | 108/14 |
| 8,833,271 | B2 | * | 9/2014 | Everett | 108/64 |
| 2003/0131766 | A1 | * | 7/2003 | Petlakh | 108/64 |
| 2005/0076817 | A1 | * | 4/2005 | Boks et al. | 108/103 |
| 2010/0139531 | A1 | * | 6/2010 | Valeriote | 108/90 |

* cited by examiner

*Primary Examiner* — Jose V Chen
(74) *Attorney, Agent, or Firm* — Wood, Herron & Evans, L.L.P.

(57) ABSTRACT

A table top extension and method for increasing the table top surface area of an existing table. The table top extension includes at least first and second planar panel sections each having a first, inner peripheral edge and a second, outer peripheral edge. The first, inner peripheral edges include interlocking tongue and groove structure such that the first, inner peripheral edges can be locked together to form the table top extension having a combined table top area defined by at least the first and second planar panel sections. The second, outer peripheral edges of the first and second planar panel sections align to form an outer peripheral edge of the table top extension when the first and second panel sections are locked together with the interlocking tongue and groove structure. The table top extension is configured as a planar panel including at least the first and second planar panel sections, and may be placed on the existing table to increase the table top surface area by placement of the outer peripheral edge of the table top extension radially outside of an outer peripheral edge of the existing table, relative to a center point of the table.

20 Claims, 5 Drawing Sheets

TABLE TOP EXTENSION AND METHOD FOR INCREASING THE TABLE TOP SURFACE AREA OF AN EXISTING TABLE TOP

TECHNICAL FIELD

The present invention generally relates to tables and, more particularly, to table top extensions and methods for increasing the surface area of an existing table top.

BACKGROUND

Table tops are made with a variety of shapes and sizes. Two common shapes are round and rectangular, typically with seating capacities of two or more. Traditional methods of expanding the surface area and/or seating capacity of a table have included various manners of adding a table top section or leaf to the table. With an existing round table, for example, one or more leaves added to the center of the table top will make it generally oblong or oval in shape. With an existing rectangular table top, adding one or more leaves will form the table top into a longer rectangle. The designs of these tables are relatively complex in order to allow for the ability of the table sections to be pulled apart for accommodating the added leaf, and then pushed back together and locked in place.

Other proposals for expanding the surface area of an existing table top have included adding outer sections to the periphery or outer edges of the table in various manners. Some designs require special connecting structure on the existing table that will mate with connecting structure on the outer sections and/or may require additional table legs coupled with the added table top sections for purposes of supplying the necessary support and stability.

Still further designs for expanding the surface area of a table include drop-leaf tables in which the leaves are fixed with hinges to the main table top, and are only extended on the same plane as the main table top when added seating capacity or table top area is needed. One drawback of drop-leaf tables is that the side or sides of the table with the drop leaf or leaves may not be easily used by a seated individual when the leaf is not extended. In this regard, the vertically oriented drop leaf reduces or eliminates the leg room for a seated individual. Moreover, the support provided for the leaf in the extended position may not be adequate enough to carry a large load, and this can affect the integrity of the hinges.

Various other designs have been proposed over the years that involve even more complex mechanisms and table top designs to allow additional seating capacity and table top surface area. It would be desirable to provide a manner of expanding the surface area of an existing table top in a relatively simple, and cost effective manner while enabling the existing table to provide the structural support to the expanded table top.

SUMMARY

In a first general embodiment, the invention provides a table top extension for increasing the table top surface area of an existing table. The table top extension includes at least first and second planar panel sections each having a first, inner peripheral edge and a second, outer peripheral edge. The first, inner peripheral edges include interlocking tongue and groove structure such that the first, inner peripheral edges can be locked together to form the table top extension having a combined table top area defined by at least the first and second planar panel sections. The second, outer peripheral edges of the first and second planar panel sections align to form an outer peripheral edge of the table top extension when the first and second panel sections are locked together with the interlocking tongue and groove structure. The table top extension is configured as a planar panel comprised of at least the first and second planar panel sections, and is placed on the existing table top to increase the table top surface area. In this manner the outer peripheral edge of the table top extension lies radially outside of an outer peripheral edge of the existing table, relative to a center point of the table. It should be understood that the outer periphery of the table top extension may be of any desired shape, such as circular, rectangular, polygonal, etc., and the use of the term "radial" is not meant to restrict the shape to round. Moreover, the underlying table top may be of any peripheral shape, and may or may not correspond to the peripheral shape of the table top extension.

In certain embodiments, the first and second planar panel sections are identical. If further panel sections are utilized, they may also be formed identical to the first and second planar panel sections. For example, a round table top extension may be formed with four identically designed pie-shaped planar panel sections. Each of the four pie-shaped sections would occupy a 90 degree section of the round table top extension. Such a design may, for example, expand the seating capacity of a four seat round table to six or eight seats. If the table is an outdoor patio table, for example, a hole may be located at a center of the table top extension for accommodating an umbrella pole. The hole may be formed of respective hole portions located at the radial inner ends or corners of the planar panel sections. This feature can apply to round table top extensions, rectangular table top extensions or any other shape.

If the total number of planar panel sections comprising the table top extension is even, then each planar panel section can have two grooves facing in the same direction for respectively mating with an adjacent panel section having grooves facing in an opposite direction. In other words, each panel section may have an identical design, but adjacent panel sections are flipped over relative to one another to allow for the tongue and groove structure to engage and connect. Alternatively, each planar panel section may have the tongue and groove along one inner peripheral edge facing in one direction and the groove along the second inner peripheral edge facing in an opposite direction. For table top extensions with an odd total number of panel sections, the tongues and grooves must be in this alternative configuration.

In another embodiment, the table top extension includes at least a third planar panel section having first and second inner peripheral edges and at least one outer peripheral edge. The first and second inner peripheral edges each include a tongue and groove structure such that the first and second inner peripheral edges of the third planar panel section can be locked together with the first and second planar panel sections to form the table top extension having a combined table top area defined by at least the first, second and third planar panel sections. The outer peripheral edges of the first, second and third planar panel sections align to form an overall outer peripheral edge of the table top extension when the first, second and third panel sections are locked together with the interlocking tongue and groove structures. The table top extension is configured as a planar panel comprised of at least the first, second and third planar panel sections, and may be placed on the existing table to increase the table top surface area by placement of the outer peripheral edge of the table top extension radially outside of an outer peripheral edge of the existing table.

In a case such as the one in which the table top extension has a total of three panel sections, or any other odd total number of panel sections, at least one panel section has one upwardly facing groove and one downwardly facing groove for respectively mating with an adjacent panel section.

In yet another specific embodiment, the table top extension includes at least a fourth planar panel section having first and second inner peripheral edges and at least one outer peripheral edge. The first and second inner peripheral edges each include a tongue and groove structure such that the first and second inner peripheral edges of the fourth planar panel section can be locked together with two of the first, second and third planar panel sections to form the table top extension having a combined table top area defined by at least the first, second, third and fourth planar panel sections. The outer peripheral edges of the first, second, third and fourth planar panel sections align to form an overall outer peripheral edge of the table top extension when the first, second, third and fourth planar panel sections are locked together with the interlocking tongue and groove structures. In this embodiment, the table top extension is configured as a planar panel comprised of at least the first, second, third and fourth planar panel sections, and may be placed on the existing table to increase the table top surface area by placement of the outer peripheral edge of the table top extension radially outside of an outer peripheral edge of the existing table.

In another aspect, the invention provides a method of increasing the table top surface area of an existing table top using a table top extension having a surface area greater than the surface area of the existing table top. The method includes interlocking at least first and second planar panel sections together by engaging tongue and groove structure along a first, inner peripheral edge of the first planar panel section with tongue and groove structure along a first, inner peripheral edge of the second planar panel sections to form the table top extension having a combined table top area defined by at least the first and second planar panel sections. The method further involves aligning a second, outer peripheral edge of the first, planar panel section with a second, outer peripheral edge of the second planar panel sections to form an outer peripheral edge of the table top extension when the first and second panel sections are locked together with the tongue and groove structures. Finally, the table top extension, comprised of at least the first and second planar panel sections, is placed on the existing table top to increase the table top surface area of the existing table by locating the outer peripheral edge of the table top extension radially outside of an outer peripheral edge of the existing table top.

As set forth herein, the method can also include the use of any number of planar panel sections to construct the table top extension, and may involve the use of any desired peripheral shape for the table top extension. Additional details and advantages of the table top extensions and methods will become more apparent upon review of the following detailed description taken in conjunction with the accompanying drawings.

DETAILED DESCRIPTION

Figure 1:
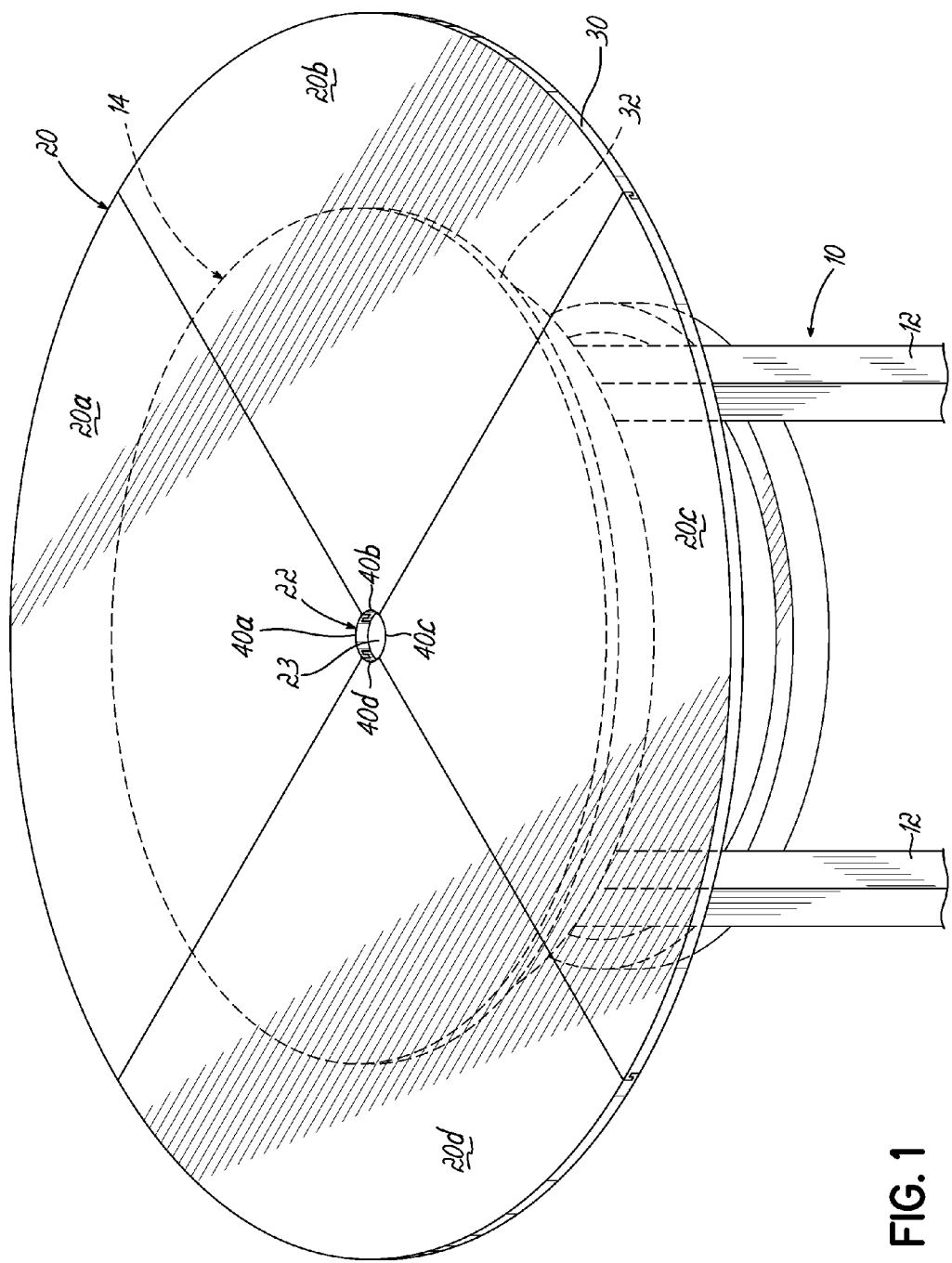
FIG. 1 is a perspective view of an existing table with a first illustrative embodiment of a table top extension, constructed in accordance with the invention, and placed thereon to increase seating capacity of the table from four to six.

FIG. 1 illustrates an existing table 10, which may be of any desired design, size and configuration. In this case, the table 10 is illustrated as a conventional patio style table for outdoor use. The table 10 includes four legs 12, only two of which are shown. The table 10 may seat four individuals and includes a table top 14 having a surface area sized appropriately for accommodating those four individuals and their chairs. For example, the table top 14 may have a diameter of 42 inches. In accordance with a first illustrative embodiment of the invention, a table top extension 20 is provided and is placed on the existing table top 14. In this regard, the table top extension 20 requires no additional support other than the existing table 10 and its table top 14. The table top extension 20 may have a diameter of 54 inches to increase the seating capacity comfortably to six individuals. In this manner the effective surface area of the existing table 10 is increased by about 65%. More generally, and regardless of shape, table top extensions according to the embodiments of this invention may increase the effective surface area of an existing table top by at least about 25% to about 75% or more, while maintaining stability of the table top extension using the underlying table as support. The extent to which surface area may be increased will depend on various parameters such as the size and shape of the underlying and existing table top as compared to the table top extension. The table top extension 20 is comprised of four planar panel sections 20a, 20b, 20c, 20d each having a pie shape and occupying a 90° portion of the round table top extension 20. The table top extension 20 is therefore in the form of a planar panel which is unitary in construction due to the connections between the four pie-shaped panel sections 20a, 20b, 20c, 20d. A hole 22 is formed at the center point of the table top extension 20 and coincides with a hole (not shown) that may be at the center of the existing table top 14. For example, in the case of a patio table 10, as shown, a center hole 23 is provided to accommodate the pole of an umbrella (not shown).

Figure 2:
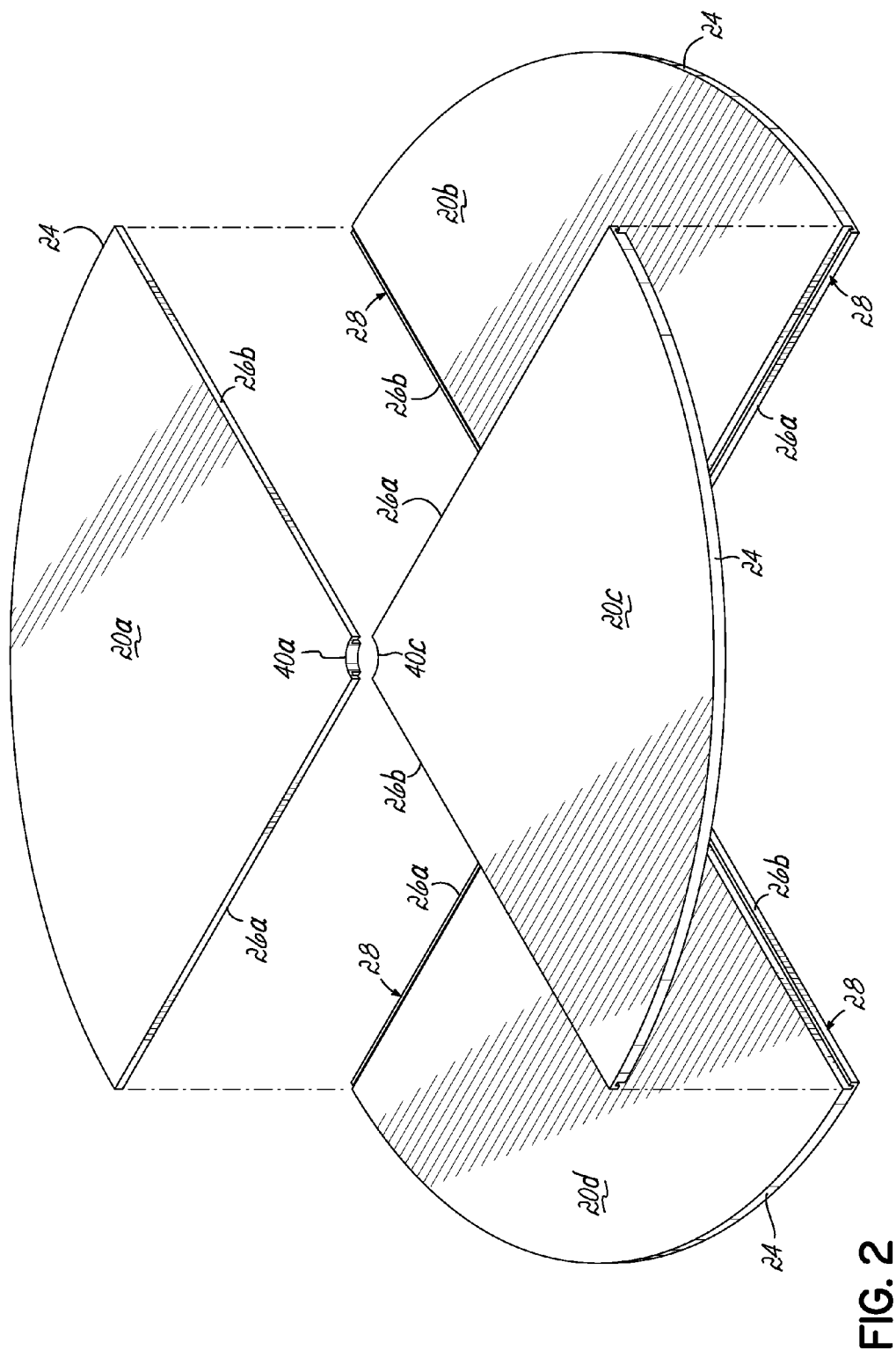
FIG. 2 is a schematic perspective view of the table top extension shown in FIG. 1 showing the manner of connecting the planar panel extensions together to form a unitary planar panel comprising the table top extension.
Figure 3:
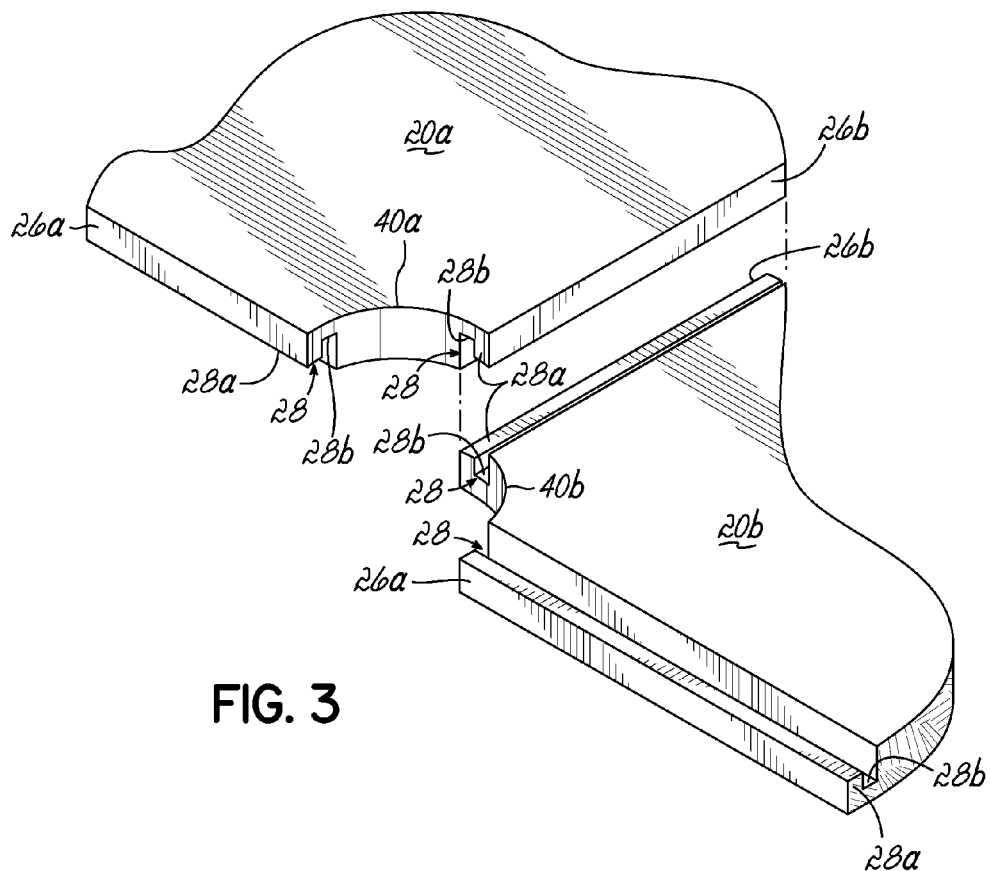
FIG. 3 is a fragmented and enlarged perspective view of two planar panel sections from FIG. 2 in the process of being connected together using the tongue and groove structure.
Figure 4:
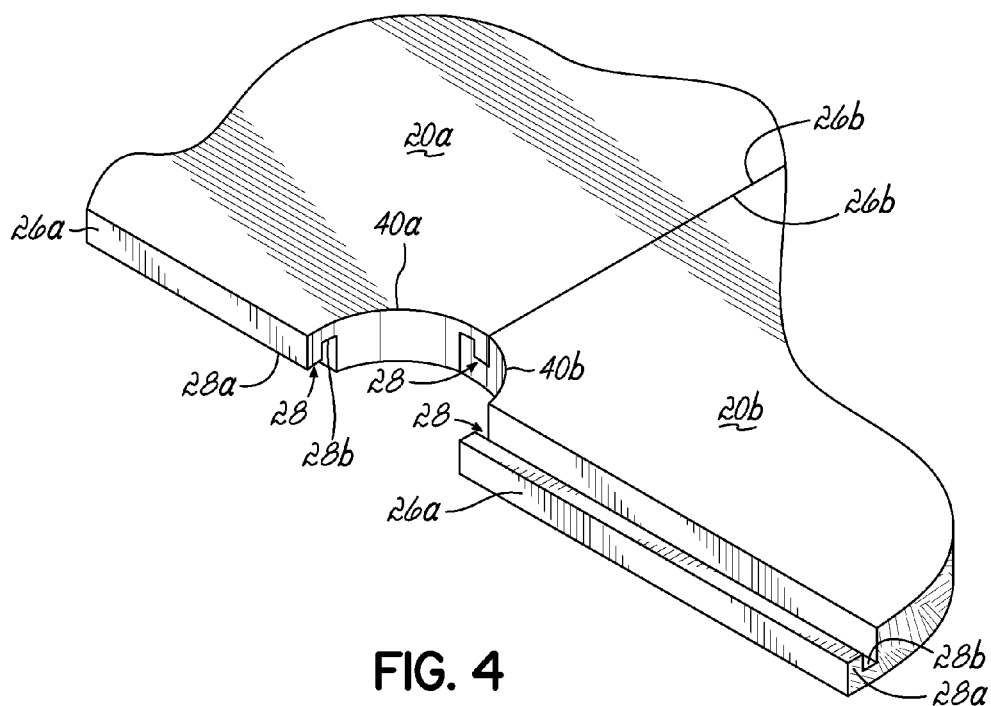
FIG. 4 is a fragmented and enlarged perspective view similar to FIG. 3 but showing the two planar panel sections connected together.

FIG. 2 schematically illustrates the connection of the four pie-shaped, planar panel sections 20a, 20b, 20c, 20d. In this regard, each panel section 20a, 20b, 20c, 20d includes an outer peripheral edge 24 and two inner peripheral edges 26a, 26b. The inner peripheral edges 26a, 26b each include identical tongue and groove connecting structure 28, including an elongate tongue 28a and an elongate groove 28b. The four panel sections 20a, 20b, 20c, 20d may be identically designed. For example, as better shown in FIGS. 3 and 4, each tongue 28a and groove 28b extends along the two inner edges 26a, 26b of each pie-shaped planar panel section 20a, 20b, 20c, 20d. Although the planar panel sections 20a, 20b, 20c, 20d are identically designed, in order to properly connect them together, alternating panel sections 20a, 20c are flipped over relative to the two other planar panel sections 20b, 20d before connecting the panel sections 20a, 20b, 20c, 20d in the manner shown in FIGS. 3 and 4. Therefore, two panel sections 20a and 20c will have the elongate grooves 28b facing one way, such as upwardly as shown in FIG. 3, while the other panel sections 20b and 20d will have the elongate grooves 28b facing the opposite way, i.e., downwardly as shown in FIG. 3. Adjacent panel sections will be connected firmly together when the tongue 28a of one panel section 20a is engaged within the groove 28b of the adjacent panel section 20b as shown in FIG. 4. This will create a unitary panel comprised of the two panel sections 20a, 20b. When the four panel sections 20a, 20b, 20c, 20d are connected together in this manner as shown in FIGS. 1 and 2, the four panel sections 20a, 20b, 20c, 20d will create a unitary panel comprising the table top extension 20. Because of the tongue and groove connecting structure 28, the seams between adjacent panel sections 20a, 20b, 20c, 20d will be smooth. That is, the overall top surface of the table top extension 20 will be smooth and level.

The outer peripheral edges 24 of the respective panel sections 20a, 20b, 20c, 20d will align with one another to form the outer peripheral edge 30 of, in this case, the round table top extension 20 as best illustrated in FIG. 1. As further shown in FIG. 1, when the table top extension 20 is placed on the existing table top 14, the outer peripheral edge 30 of the table top extension 20 is located radially outside of the outer peripheral edge 32 of the existing table top 14. This results from the fact that the table top extension 20 occupies a greater area than the existing table top 14, and effectively expands the surface area provided by the existing table top 14. The additional surface area provided by the table top extension 20 thereby creates additional space on top of and around the table 10 for additional seating capacity.

Returning to FIGS. 1-4, the planar panel sections 20a, 20b, 20c, 20d, in this embodiment, include portions 40a, 40b, 40c, 40d of the hole 22 that accommodates an umbrella pole (not shown) when the panel sections 20a, 20b, 20c, 20d are connected together as shown in FIG. 1. It will be appreciated that the table top extension 20 may be comprised of different numbers of planar panel sections than the four planar panel sections 20a, 20b, 20c, 20d shown in FIGS. 1 and 2. Moreover, if accommodation for an umbrella pole is needed, the sizes of the hole portions 40a, 40b, 40c, 40d provided in each panel section 20a, 20b, 20c, 20d will change accordingly. The planar panel sections 20a, 20b, 20c, 20d may be formed of any desired material, such as wood, polymer, or composites of various forms.

Figure 5:
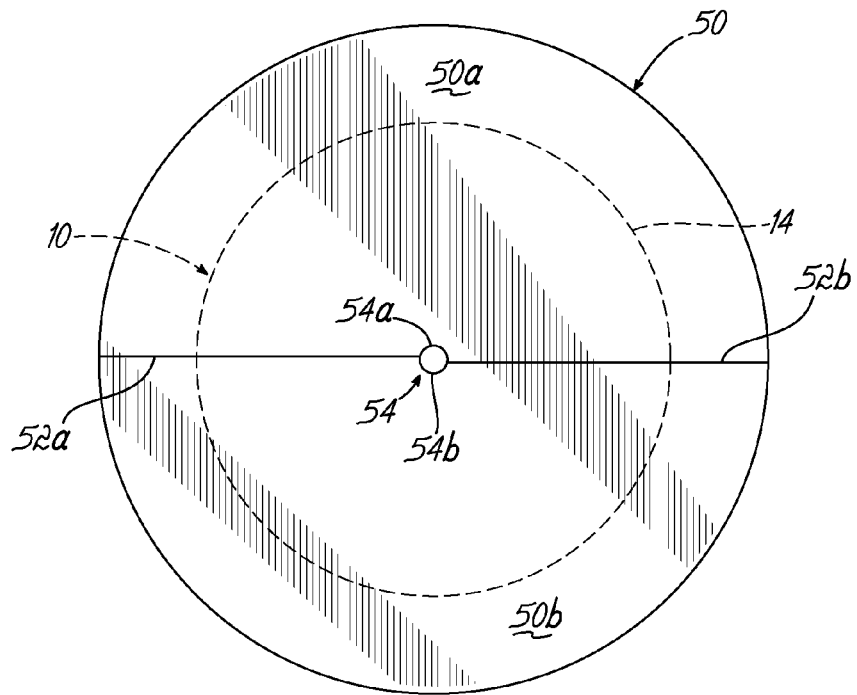
FIG. 5 is a top plan view showing an alternative embodiment of the table top extension comprising a total of two planar panel sections used to form a unitary planar panel that is round.
Figure 6:
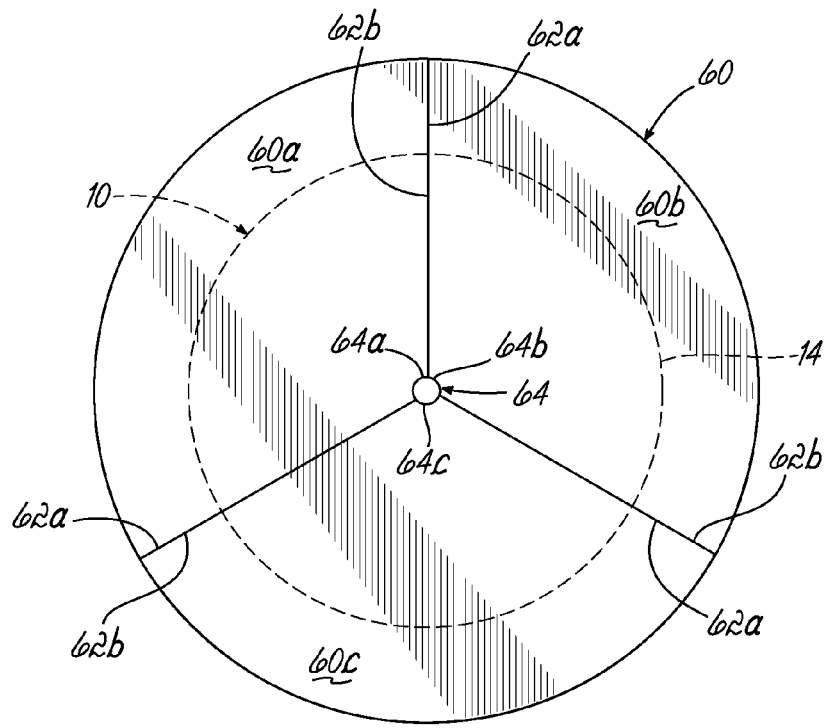
FIG. 6 is a top plan view showing another alternative embodiment of the table top extension comprising a total of three planar panel sections used to form a unitary planar panel that is round.

FIGS. 5 and 6 illustrate additional alternative embodiments of round table top extensions 50 and 60 formed, respectively, with two panel sections 50a, 50b and three planar panel sections 60a, 60b, 60c. In each case, the table top extension 50 or 60 increases the effective surface area of the underlying table top 14 of an existing table 10. In the case of two planar panel sections 50a, 50b, such as shown in FIG. 5, the inner edge 52a, 52b of each section 50a, 50b extends across the equator of the table top extension 50. The inner edges 52a, 52b include tongue and groove structure (not shown) just as previously described. The central hole 54, used for accommodating an umbrella pole, comprises hole portions 54a, 54b, each of which is semicircular. Each of the two planar panel sections 50a, 50b is identically designed, similar to the concept shown and described with respect to FIGS. 1-4, but one of the semicircular panel sections 50a is flipped 180° relative to the other section 50b such that the tongue and groove structures of the two panel sections 50a, 50b face in opposite directions.

FIG. 6 illustrates a similar concept for a round table top extension 60, except utilizing an odd total number of planar panel sections 60a, 60b, 60c which, in this case, is three. The difference between FIGS. 5 and 6, aside from the number and size of the pie-shaped planar panel sections 60a, 60b, 60c, is that with the odd number panel sections 60a, 60b, 60c, each of the panel sections 60a, 60b, 60c will have one tongue and groove structure (not shown) along one inner peripheral edge 62a facing upwardly and the other tongue and groove structure (not shown) along the other inner peripheral edge 62b facing downwardly. This will allow adjacent planar panel sections 60a, 60b, 60c to be connected together with the tongue of one panel section 60a, 60b, 60c engaging in the groove of an adjacent panel section 60a, 60b, 60c on each side thereof. Alternatively, one of the planar panel sections, such as 60a, can have one tongue and groove structure along one inner peripheral edge 62a facing upwardly and the other tongue and groove structure (not shown) along the other inner peripheral edge 62b facing downwardly. In this alternative, the remaining two planar panel sections 60b, 60c (and any additional panel sections as long as the total number of panel sections is odd) will be identical and have each tongue and groove structure facing in the same direction. With regard to these latter panel sections 60b, 60c, they will be flipped or oriented 180° relative to each other as shown in FIGS. 3 and 4. Again, in this case, a central hole 64 is shown for accommodating an umbrella pole and respective portions 64a, 64b, 64c of the hole 64 are formed the adjacent planar panel sections 60a, 60b, 60c, at radial inner ends or corners of the pie-shaped panel sections 60a, 60b, 60c. The portions 64a, 64b, 64c of the hole 64 are formed as a 120° arcs or partial round cut-outs at the inner corners of the pie-shaped panel sections 60a, 60b, 60c.

Figure 7:
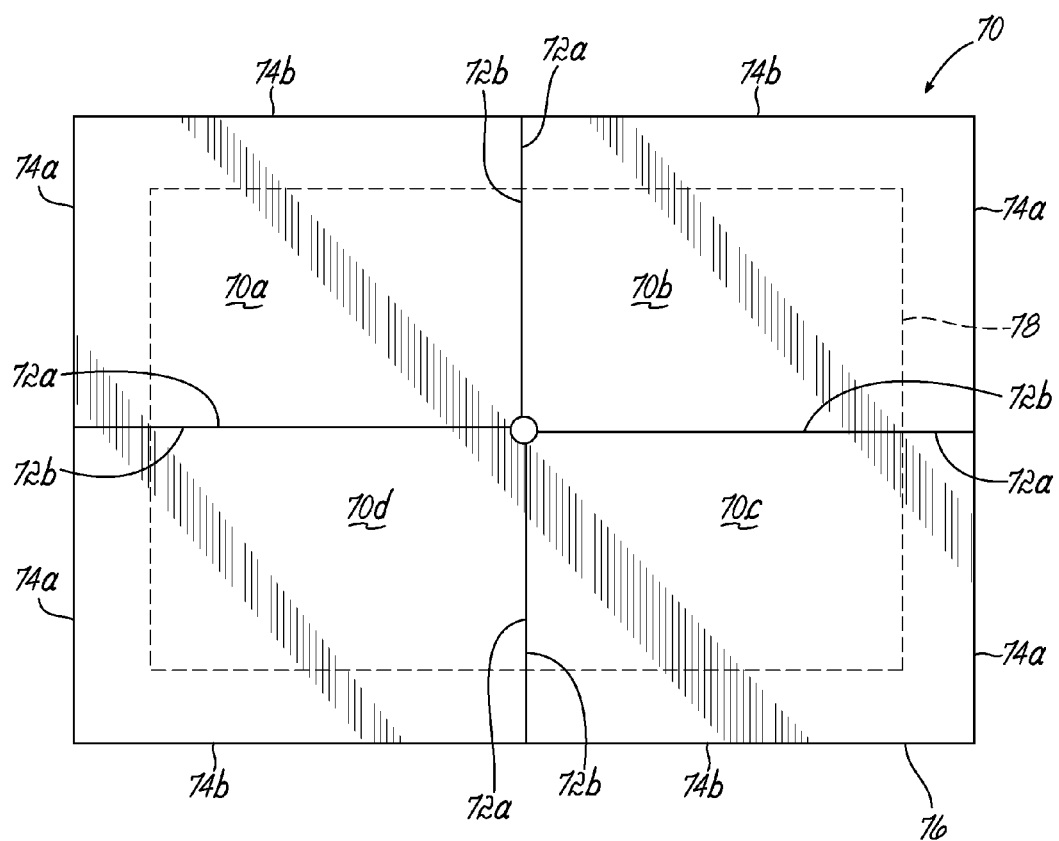
FIG. 7 is a top plan view showing another alternative embodiment of the table top extension comprising a total of four planar panel sections used to form a unitary planar panel that is rectangular.

FIG. 7 illustrates a table top extension 70 similar to the previous embodiments, but having an overall rectangular shape, and comprised of four smaller rectangular, planar panel sections 70a, 70b, 70c, 70d. Each panel section 70a, 70b, 70c, 70d comprises two inner peripheral edges 72a, 72b and two outer peripheral edges 74a, 74b. The outer peripheral edges 74a, 74b align when the four panel sections 70a, 70b, 70c, 70d are connected together to form an overall outer peripheral edge 76 of the rectangular table top extension 70. The same tongue and groove connections and connection method are used for the rectangular embodiment shown in FIG. 7 as illustrated and described above with regard to FIGS. 1-4. In this case, the underlying table top 78 is shown in dashed lines and the unitary planar panel or table top extension 70 constructed using the planar panel sections 70a, 70b, 70c, 70d is effective for increasing the surface area of the underlying table top 78 such that the table has increased seating capacity and/or increased capacity to hold items on the table top extension 70, as desired. As with the first embodiment shown in FIGS. 1-4, each of the four planar panel sections 70a, 70b, 70c, 70d is identically designed, although a different shape is used in accordance with the overall shape of the table top extension 70 (i.e., rectangular in this case). Panel sections 70a, 70c may have upwardly facing grooves (not shown) while panel sections 70b, 70d may have downwardly facing grooves (not shown). In this manner, the tongues of panel sections 70a, 70c will fit within the grooves of panel sections 70b, 70d. In this configuration, the panel sections 70a, 70b, 70c, 70d will each be identically designed, but panel sections 70a, 70c will be flipped over 180° relative to panel sections 70b, 70d. Alternatively, as previously described, each panel section 70a, 70b, 70c, 70d may have one tongue and groove along a first inner peripheral edge 72a facing in one direction and another tongue and groove along the second inner peripheral edge 72b facing in the opposite direction.

It will be understood that table top extensions formed in accordance with the invention may be manufactured in various convention manners. For example, if the table top extensions are formed of wood, then a single piece of wood may be cut into the required number of planar panel sections and then the tongue and groove elements may be routed along each of the inner peripheral edges. The central umbrella hole may be formed after the initial piece of wood is cut into the planar panel sections or afterwards. As another example, each planar panel section may be molded or otherwise fabricated from polymeric materials. This can provide additional durability and/or weatherproofing. When not in use, the planar panel sections are easily stored, such as by being hung on a wall.

While the present invention has been illustrated by the description of one or more embodiments thereof, and while the embodiments have been described in considerable detail, they are not intended to restrict or in any way limit the scope of the appended claims to such detail. The various features as described herein may be used in the described combinations or in any combination according to the needs of the user. Additional advantages and modifications will readily appear to those skilled in the art. The invention in its broader aspects is therefore not limited to the specific details, representative apparatus and method and illustrative examples shown and described. Accordingly, departures may be from such details without departing from the scope or spirit of the general inventive concept.

What is claimed is:

1. A table top extension for increasing the table top surface area of an existing table, comprising:
    at least first and second planar panel sections each having a top planar surface, a bottom planar surface, a first, inner peripheral edge and a second, outer peripheral edge, the first, inner peripheral edges of the panel sections including interlocking tongue and groove structure extending along an entire length of the first, inner peripheral edges such that the first, inner peripheral edges can be locked together to form the table top extension having a combined table top area defined by at least the first and second planar panel sections,
    wherein the interlocking tongue and groove structure of adjacent panel sections form a mirror image relative to one another and the second, outer peripheral edges of the first and second planar panel sections align to form an outer peripheral edge of the table top extension, when the first and second panel sections are locked together with the interlocking tongue and groove structure,
    wherein the interlocking tongue and groove structure does not extend upwardly beyond the top planar surface of the corresponding panel section and also does not extend downwardly beyond the bottom planar surface of the corresponding panel section, and
    wherein the table top extension is configured as a planar panel comprised of at least the first and second planar panel sections, and may be placed on the existing table to increase the table top surface area by placement of the outer peripheral edge of the table top extension radially outside of an outer peripheral edge of the existing table.

2. The table top extension of claim 1, wherein the first and second planar panel sections are identical.

3. The table top extension of claim 1, wherein the at least first and second planar panel sections are configured to be retained in position by their own weight on the existing table when the interlocking tongue and groove structure is engaged on the at least first and second planar panel sections.

4. The table top extension of claim 3, further comprising a hole that is formed by respective hole portions of each of the at least first and second planar panel sections and that is located at a center of the table top extension for accommodating an umbrella pole.

5. The table top extension of claim 1, wherein the planar panel comprised of at least the first and second planar panel sections is round in shape.

6. The table top extension of claim 1, wherein the planar panel comprised of at least the first and second planar panel sections is rectangular in shape.

7. The table top extension of claim 1, wherein the total number of planar panel sections comprising the planar panel is even, and each panel section has two grooves facing in the same direction for respectively mating with an adjacent panel section having grooves facing in an opposite direction relative to said two grooves.

8. The table top extension of claim 1, further comprising:
    at least a third planar panel section having first and second inner peripheral edges and at least one outer peripheral edge, the first and second inner peripheral edges each including a tongue and groove structure such that the first and second inner peripheral edges of the third planar panel section can be locked together with the first and second planar panel sections to form the table top extension having a combined table top area defined by at least the first, second and third planar panel sections, and the outer peripheral edges of the first, second and third planar panel sections align to form an overall outer peripheral edge of the table top extension when the first, second and third panel sections are locked together with the interlocking tongue and groove structures,
    wherein the table top extension is configured as a planar panel comprised of at least the first, second and third planar panel sections, and may be placed on the existing table to increase the table top surface area by placement of the outer peripheral edge of the table top extension radially outside of an outer peripheral edge of the existing table.

9. The table top extension of claim 8, wherein the planar panel comprised of at least the first, second and third planar panel sections is round in shape.

10. The table top extension of claim 8, wherein the total number of planar panel sections comprising the planar panel is odd, and at least one panel section has one upwardly facing groove and one downwardly facing groove for respectively mating with an adjacent panel section.

11. The table top extension of claim 8, further comprising:
    at least a fourth planar panel section having first and second inner peripheral edges and at least one outer peripheral edge, the first and second inner peripheral edges each including a tongue and groove structure such that the first and second inner peripheral edges of the fourth planar panel section can be locked together with two of the first, second and third planar panel sections to form the table top extension having a combined table top area defined by at least the first, second, third and fourth planar panel sections, and the outer peripheral edges of the first, second, third and fourth planar panel sections align to form an overall outer peripheral edge of the table top extension when the first, second, third and fourth planar panel sections are locked together with the interlocking tongue and groove structures, wherein the table top extension is configured as a planar panel comprised of at least the first, second, third and fourth planar panel sections, and may be placed on the existing table to increase the table top surface area by placement of the outer peripheral edge of the table top extension radially outside of an outer peripheral edge of the existing table.

12. A method of increasing the table top surface area of an existing table top using a table top extension having a surface area greater than the surface area of the existing table top, comprising:
    interlocking at least first and second planar panel sections, each panel section including a top planar surface, a bottom planar surface, a first, inner peripheral edge and a second, outer peripheral edge, together by engaging tongue and groove structure extending along an entire length of the first, inner peripheral edge of the first planar panel section with tongue and groove structure extending along an entire length of the first, inner peripheral edge of the second planar panel section to form the table top extension having a combined table top area defined by at least the first and second planar panel sections, wherein the interlocking tongue and groove structure of adjacent panel sections form a mirror image relative to one another when the first and second panel sections are locked together with the interlocking tongue and groove structure,
    aligning the second, outer peripheral edge of the first, planar panel section with the second, outer peripheral edge of the second planar panel section to form an outer peripheral edge of the table top extension when the first and second panel sections are locked together with the tongue and groove structures, the tongue and groove structure not extending upwardly beyond the top planar surface of the corresponding panel section and also not extending downwardly beyond the bottom planar surface of the corresponding panel section, such that the table top extension provides a continuous outer peripheral edge and a planar panel designed to be placed on the existing table top, and
    placing the table top extension comprised of at least the first and second planar panel sections on the existing table top to increase the table top surface area of the existing table by locating the outer peripheral edge of the table top extension radially outside of an outer peripheral edge of the existing table top.

13. The method of claim 12, wherein the existing table top is round in shape, and the table top extension is round in shape.

14. The method of claim 12, wherein the existing table top is rectangular in shape, and the table top extension is rectangular in shape.

15. The method of claim 12, wherein the total number of planar panel sections is even, and each panel section has two grooves facing in the same direction for respectively mating with adjacent panel sections having grooves facing in an opposite direction relative to said two grooves.

16. The method of claim 12, further comprising:
    interlocking at least a third planar panel section with at least one of the first or second planar panel sections by engaging tongue and groove structure along a first, inner peripheral edge of the third planar panel section with the tongue and groove structure along the first, inner peripheral edge of the first or second planar panel sections to form the table top extension having a combined table top area defined by at least the first, second and third planar panel sections,
    aligning a second, outer peripheral edge of the third planar panel section with the second, outer peripheral edge of at least one of the first or second planar panel sections to form an outer peripheral edge of the table top extension when at least the first, second and third planar panel sections are locked together with the tongue and groove structures, and
    placing the table top extension comprised of at least the first, second and third planar panel sections on the existing table top to increase the table top surface area of the existing table by locating the outer peripheral edge of the table top extension radially outside of an outer peripheral edge of the existing table top.

17. The method of claim 16, wherein the total number of planar panel sections comprising the planar panel is odd, and each panel section has one upwardly facing groove and one downwardly facing groove for respectively mating with an adjacent panel section.

18. The method of claim 16, further comprising:
    interlocking at least a fourth planar panel section with at least one of the first, second or third planar panel sections by engaging tongue and groove structure along a first, inner peripheral edge of the fourth planar panel section with the tongue and groove structure along the first, inner peripheral edge of the first, second or third planar panel sections to form the table top extension having a combined table top area defined by at least the first, second, third and fourth planar panel sections,
    aligning a second, outer peripheral edge of the fourth planar panel section with the second, outer peripheral edge of at least one of the first, second or third planar panel sections to form an outer peripheral edge of the table top extension when at least the first, second, third and fourth planar panel sections are locked together with the tongue and groove structures, and
    placing the table top extension comprised of at least the first, second, third and fourth planar panel sections on the existing table top to increase the table top surface area of the existing table by locating the outer peripheral edge of the table top extension radially outside of an outer peripheral edge of the existing table top.

19. The method of claim 12, further comprising:
    retaining the at least first and second planar panel sections in position by their own weight when the interlocking tongue and groove structure is engaged on the at least first and second planar panel sections.

20. The method of claim 19, further comprising:
    forming a hole with respective hole portions of each of the at least first and second planar panel sections located at a center of the table top extension for accommodating an umbrella pole.

* * * * *